United States Patent
Zelkha et al.

(10) Patent No.: US 7,641,931 B2
(45) Date of Patent: Jan. 5, 2010

(54) INDUSTRIAL TOMATO PROCESS AND PRODUCT OBTAINED THEREOF

(75) Inventors: Morris Zelkha, Omer (IL); Dov Hartal, Tel Aviv (IL); Zvi Albert, Kiryat Bialik (IL)

(73) Assignee: Lycored Natural Products Industries, Ltd., Beer Sheva (IL)

( * ) Notice: Subject to any disclaimer, the term of this patent is extended or adjusted under 35 U.S.C. 154(b) by 579 days.

(21) Appl. No.: 10/525,064

(22) PCT Filed: Aug. 17, 2003

(86) PCT No.: PCT/IL03/00678

§ 371 (c)(1),
(2), (4) Date: Sep. 13, 2005

(87) PCT Pub. No.: WO2004/016104

PCT Pub. Date: Feb. 26, 2004

(65) Prior Publication Data

US 2006/0134306 A1    Jun. 22, 2006

(30) Foreign Application Priority Data

Aug. 19, 2002  (IL) ...................... 151342

(51) Int. Cl.
*A23L 1/212*    (2006.01)
(52) U.S. Cl. ........................ 426/615; 426/478; 426/519; 426/589; 426/640
(58) Field of Classification Search ................. 426/615, 426/640, 74, 620, 639, 658, 478, 519, 589
See application file for complete search history.

(56) References Cited

U.S. PATENT DOCUMENTS

| 2,959,486 A | * | 11/1960 | Strashun et al. ............. 426/398 |
| 4,670,281 A | | 6/1987 | Bradley |
| 5,837,311 A | | 11/1998 | Zelkha et al. |
| 2007/0110857 A1 | | 5/2007 | Hartal et al. |

FOREIGN PATENT DOCUMENTS

CA    2307673    4/2000

(Continued)

OTHER PUBLICATIONS

Sulc, D. "Vergleichende Untersuchungen An Tomatenkonzentraten, Hergestellt Nach dem Kalssischen Und Nach Dem Modifizierten Serum - Verfahren," Flussiges Obst, Fluessiges Obst, Schoenborn, DE, vol. 43, No. 9, pp. 334-338, 340,34 and p. 335, figure 1 (1976).

(Continued)

*Primary Examiner*—Helen F Pratt
(74) *Attorney, Agent, or Firm*—Browdy and Neimark, P.L.L.C.

(57) ABSTRACT

The invention relates to a tomato pulp composition wherein the particle size is not greater than 2.5 which does not contain seeds or peels from the tomato and has a lycopene concentration which is 5 to 15 folds higher than the lycopene concentration in the tomatoes from which said pulp is obtained. The invention further provides an industrial process for obtaining tomato pulp and tomato concentrate from tomato juice. The invention further provides a method for controlling the viscosity and lycopene concentration of tomato products, tomato concentrate or modified tomato juice, by separating a part of the pulp from the tomato juice from which said tomato products are obtained.

4 Claims, 1 Drawing Sheet

FOREIGN PATENT DOCUMENTS

| | | |
|---|---|---|
| EP | 0608027 B1 | 7/1994 |
| JP | 07-308168 | 11/1995 |
| JP | 10-276707 | 10/1998 |
| JP | 2002-523075 | 7/2002 |
| WO | 2002/012199 A1 | 3/2000 |
| WO | 02/21935 A2 | 3/2002 |
| WO | 03/024243 A2 | 3/2003 |
| WO | WO 03/024243 * | 3/2003 |

OTHER PUBLICATIONS

Tanglertpaibul, T; Rao, Ma, "Flow properties of tomato concentrates effect of serum viscosity and pulp content," Journal of Food Science 52(2): 318-321 (1987).

Gould, "Tomato Production Processing & Technology," 3rd ed. pp. 201-217 CTI Publications, Inc.

PTO Form 892 issued with non-final Office Action mailed Sep. 15, 2009 in U.S. Appl. No. 10/525,064.

* cited by examiner

INDUSTRIAL TOMATO PROCESS AND PRODUCT OBTAINED THEREOF

FIELD OF THE INVENTION

The present invention relates to the field of tomato processing and products thereof. Particularly to a process for obtaining tomato pulp and tomato concentrate.

BACKGROUND OF THE INVENTION

One of the major products of the tomato processing industry is tomato concentrate. Tomato concentrate has a Standard of Identity. The two outstanding properties of tomato concentrate which are monitored and controlled are: a) the Brix of the concentrate, wherein the Brix is a measure of concentration. The concentration expressed as "total soluble-solids" or in units of Brix that represents the percentage of soluble solids in the liquid phase, or more accurately defined as the measure of the total soluble solids, expressed as if they were sucrose, measured by means of a refractometer. b) Viscosity. The viscosity can be measured by a Bostwick consistometer. Tanglertpaibul and Rao (*Journal of Food Science* (1987) Vol. 52, No. 2) teach of the influence of pulp content on the flow properties and viscosity of concentrates. The viscosity of tomato juice and tomato concentrate which is obtained thereof is also dependent upon whether a "hot break" or "cold break" method is employed in the process of the preparation of tomato juice. In processing the tomatoes, crushing and macerating allows for the pectolitic enzymes in the tomato to be released from the fruit cells and come in contact with the pectin in the tomato and break it down. Since the pectin is responsible for the consistency of the tomato juice, breaking down the pectin, the breakdown of the pectin results in lowering of the viscosity of the resultant tomato juice. In the "hot break" break method, the macerated tomatoes are heated to a temperature which deactivates the pectolitic enzymes, hence preventing the breakdown of pectin. Tomato juice prepared by the "hot break" method exhibits a higher viscosity, and it is generally accepted that said juice and tomato concentrate prepared thereof is of better quality then the same products prepared from the "cold break" method.

The preparation of concentrates is generally conducted by evaporating water from tomato juice. Gould (*Tomato Production Processing & Technology*, third edition, p. 201-217, CTI Publications Inc.) describes a standard process for preparing tomato juice which includes sorting and trimming fresh tomatoes to remove stems or unripe portions of the tomato, chopping and crushing, heating and extraction. The term extraction as employed by Gould is also known in the industry as "finishing" (see Tanglertpaibul and Rao). Extraction or finishing comprises of passing the crushed tomatoes through a fine screen. The tomato juice thus obtained is then concentrated by evaporating water from the tomato juice until the desired concentration expressed in Brix is reached. The Brix value of concentrate is controlled by the amount of water evaporated. However, according to the prior art methods for preparing tomato concentrate the viscosity of the tomato concentrate is a function of soluble solids concentrate expressed as the Brix value. Hence, controlling the Brix of the concentrate will also influence the viscosity. Tanglertpaibul and Rao teach that the viscosity may be controlled by varying the pulp and serum content in tomato concentrate by adding concentrated serum or pulp to tomato concentrate. However, their method is not practical for conducting on an industrial scale, since it requires a source of pulp and serum, both of which are valuable components of other tomato products which are not readily available, and thus their method would not be financially sound. Furthermore, the mixing of serum or pulp into tomato concentrate on an industrial scale presents technical difficulties due to the viscosity of the concentrate.

Accordingly, there is a long felt need for an industrial scale process for preparing tomato concentrate, wherein the viscosity of the concentrate may be controlled.

It is therefore an objective of the present invention to provide a process for obtaining tomato concentrate wherein the viscosity of the tomato concentrate may be controlled during the process.

It is another objective of the present invention to provide a process for obtaining tomato pulp, a versatile tomato ingredient, wherein said tomato pulp has improved properties. A further objective of the present invention is to provide a method for controlling the viscosity of tomato concentrate and tomato juice.

A further objective of the present invention is to provide a method for preparing tomato concentrate of 30° Brix with more tomato flavor without effecting its viscosity.

It is yet a further objective of the present invention to overcome the shortcoming of the prior art methods.

Other objectives of the invention will become apparent as the description proceeds.

SUMMARY OF THE INVENTION

The present invention provides an industrial process for obtaining tomato pulp and tomato concentrate from tomato juice, said process comprising of the following steps:

a) separating the tomato juice to two parts, b) one part containing up to 20% of the total tomato juice is separated into pulp and serum, c) the serum obtained from step b) is added to the second part of the juice which is further concentrated to obtain tomato concentrate.

The present invention further provides a method for controlling the viscosity and lycopene content of tomato concentrate or tomato juice by removing a portion of the pulp from the tomato juice. Wherein tomato concentrate is obtained by the process, the part of the pulp which is separated from the juice is separated before concentrating the tomato juice to tomato concentrate.

Further provided by the present invention is tomato pulp ((also referred to as pulp composition) of a particle size not greater than 1.5 mm which does not contain seeds or peels and has a lycopene concentration which is 5 to 15 folds higher than the lycopene concentration in the tomatoes from which said pulp is obtained, wherein said pulp when dried has a high water absorbency capacity ratio. Said ratio of dried pulp: water is greater than 1:13 and can reach up to 1:25.

According to a further aspect of the present invention the composition of the present invention which has a high concentration of lycopene and a very weak tomato taste, may be used as a colorant, particularly, as a colorant for food and edible products.

A further aspect of the present invention provides for the use of the pulp composition as starting material for obtaining tomato oleoresin and lycopene.

DETAILED DESCRIPTION OF A PREFERRED EMBODIMENT OF THE INVENTION

Figure 1:
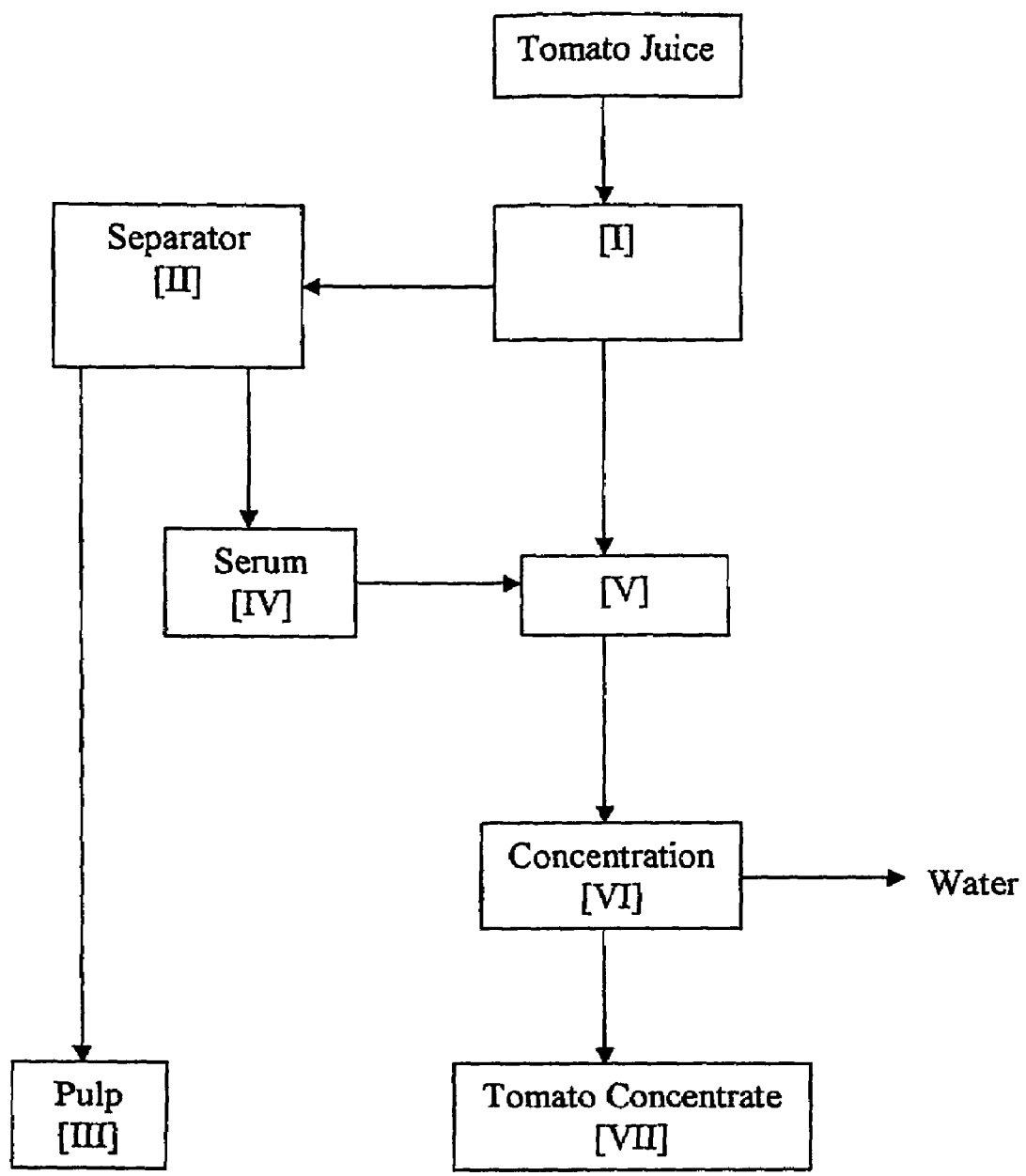
FIG. 1—Flow chart of the process for obtaining tomato concentrate and tomato pulp.

The following description is illustrative of embodiments of the invention. The following description is not to be construed as limiting, it being understood that the skilled person may carry out many obvious variations to the invention.

Throughout the description, percentages of components are by weight, and measures are metric unless specifically noted differently. The term "tomato pulp" refers to the portion of the tomato which contains the water insoluble tomato solids (about 1% from the tomato weight), wherein said pulp contains about 92-75% serum. Serum being the liquid portion of the tomato which contains most of the water soluble components of the tomato.

The process of the present invention while described as a continuous process may be conducted as a batch process.

The known practices of the preparation of tomato concentrate is by the evaporation of water from tomato juice. Tomato juice contains about 10% pulp which contains about 75%-95% serum. It has now been surprisingly found that removing up to about 20% of the total pulp from tomato juice before concentrating the tomato juice, does not adversely effect the properties of the tomato concentrate obtained thereby or the properties of the modified tomato juice, wherein, the percentage of pulp removed depends on the nature and composition of the raw tomatoes employed in the process. Furthermore, it has surprisingly been discovered that the pulp obtained from tomato juice has improved properties, said properties relating to water absorption capacity of the dried pulp.

According to a particular embodiment of the present invention described with reference to FIG. 1, tomato juice obtained by processes known in the prior art is separated to two parts [FIG. 1, (I)]. One part which is not more than 20%, preferably not more than 15% of the total tomato juice is separated [FIG. 1, (II)] to pulp [FIG. 1, (III)] and serum [FIG. 1, (IV)]. Said separation is preferably conducted according to the process described in U.S. Pat. No. 5,837,311 which is incorporated herein by reference. U.S. Pat. No. 5,837,311 describes a process for obtaining tomato oleoresin from tomatoes which are separated to serum and pulp. Other standard methods of separation as appreciated by the skilled artisan may also be suitable for the purposes of the present invention, e.g. decantation. The serum is then added to the second portion of the tomato juice [FIG. 1, (V)] to obtain modified tomato juice which is subsequently concentrated [FIG. 1, (VI)] by evaporating water from the modified juice, providing tomato concentrate [FIG. 1, (VII)]. Unexpectedly, it has been found that adding the serum to the juice before concentrating the modified juice, facilitates the concentrating stage. This further allows to overcome the technical difficulties associated with mixing tomato concentrate with serum or pulp as conducted in the prior art, and also has advantages in terms of energy efficiency.

According to a particular embodiment of the present process, the modified tomato juice is a final product which meets the standards of tomato juice. Both the modified tomato juice and tomato concentrate obtained according to the present process will have a stronger tomato flavor, than tomato juice or concentrate obtained by the prior art methods.

The amount of pulp which is separated from the tomato juice is determined with respect to the desired viscosity and lycopene concentration which can effect the a/b ratio as tested by Hunter tristimulus calorimeter which indicates the color value of the final product, i.e. tomato concentrate or modified tomato juice. The amount of pulp removed from the juice varies due to differences in the nature and composition of the tomatoes employed in the process. This must be determined empirically in accordance to the quality (composition) of the raw tomatoes which are used for the process. Hence, the viscosity of a sample of the final product is tested. If the viscosity is higher than the desired value, then the percentage of pulp removed may be increased. In the event that the viscosity is lower than the desired value than the percent of pulp removed should be decreased. The amount of pulp removed is always maintained so that the standards for tomato juice or tomato concentrate are adhered to.

It is noteworthy that since the lycopene is predominantly in the pulp part of the tomato, the lycopene concentration in the final tomato product, i.e. tomato concentrate or tomato juice is directly proportional to the amount of pulp removed from the tomato juice. Accordingly, the viscosity and lycopene concentration of the tomato product are dependent upon the amount of pulp separated from the tomato juice.

According to a preferred embodiment of the invention the tomato juice employed in the process is tomato juice which was prepared from a process which employed a hot break stage. The hot break stage as referred to herein is a stage in which the tomato juice is heated to about 95° C. after washing, sorting and crushing the raw tomatoes, in order to deactivate the pectolitic enzymes in the tomato which are responsible for the breakdown the pectin in the tomato. Breaking down of the pectin decreases the viscosity of the tomato juice.

According to the present method of controlling the viscosity and lycopene concentration of tomato products, i.e. tomato juice and tomato concentrate, pulp from tomato juice is removed. Controlling the amount of pulp which is separated from the tomato juice allows for the control of the viscosity and lycopene content of the tomato product obtained, which can effect the a/b ratio as tested by Hunter tristimulus calorimeter which indicates the color value of the tomato concentrate. Hence, the viscosity and lycopene content of the tomato product decreases as the amount of pulp removed increases.

It is preferable that not more than 15% of the total pulp be removed from the juice, in order not to deviate from the standards for tomato concentrate and tomato juice, which require a certain Brix, color and viscosity.

According to a further aspect of the present invention the pulp obtained by the present process (hereinafter also referred to as pulp composition), wherein the particle size is not greater than 1.5 mm, preferably 0.8 mm and the lycopene concentration in the pulp (said pulp containing 75%-92% moisture) which can effect the a/b ratio as tested by Hunter tristimulus calorimeter which indicates the tomato concentrate color value, is between 5 to 15 folds greater than in the tomatoes from which said composition is obtained. The composition further does not contain any seeds or peels. This is a result of the finishing stage in the process for preparing the tomato juice which is the starting material for the process of the present invention. The finishing stage effectively removes seeds, peels and other particles which are larger than the holes in the finisher's screen. Some pieces of the peels or seeds may pass through the screen, but the amount is so small that for all practical purposes the amounts are negligible. The relatively small particle size of the pulp of the present invention, in comparison, for example, to the pulp obtained according to EP 0 608 027 allows for easier drying of the present pulp, for example by spray drying which is not possible in the case of other types of pulp, e.g. the pulp obtained according to said EP. The drying of the pulp removes above 90% of the water which is part of the serum contained in the pulp. The pulp composition of the present invention after being dried (dried, has a water absorbency capacity greater than that of the pulp obtained by other methods.

In yet a further aspect of the present invention, the composition described herein may be used as a colorant due to its strong red coloring properties. The composition has very little tomato flavor, if any at all. Thus it is particularly suitable for use as a colorant in food products. It is a safe natural colorant. The dried pulp composition may also be used as a colorant.

According to a further embodiment of the present invention, tomato oleoresin and lycopene may be obtained from the pulp composition of the present invention, for example according to the process described in U.S. Pat. No. 5,837,311. Hence the present invention further provides the use of the pulp composition as starting material for obtaining tomato oleoresin and lycopene.

The present invention presents the following advantages:
1. Tomato concentrate or tomato juice, and tomato pulp may be obtained by a single process from the same source of tomato juice.
2. The viscosity and lycopene concentration of tomato concentrate may be controlled in the process, without the need for an external source of pulp or serum. Thus allowing for better control of the tomato concentrates properties.
3. The properties of industrial tomatoes fluctuate naturally. The tomato paste is an industrial product that is required to have certain values of viscosity and color at stated soluble solids content. The present process gives to the tomato processing industry method to control the process and from variable raw material to produce concentrate or juice with the required properties.
4. The present process provides an inexpensive source of pulp.
5. The present process provides tomato products with a stronger tomato flavor.
6. Dried pulp with improved water absorbency capacity, weak tomato flavor and strong red coloring properties.
7. A safe colorant from natural sources which may also have health benefits.

EXAMPLES

Example 1

Process for Obtaining Tomato Concentrate—Control

The present Example describes a process in accordance to known industrial processes. 30 ton/hr tomato feed (Brigade variety from BetHashita Farm, 5° Brix and about 10 ppm lycopene)—after washing, sorting, crushing, hot break heating to 95° C. and finishing through Rossi & Catelli 0.8 mm screen, is fed to an evaporator. The product obtained after evaporation has a Brix of 30° and a Bostwick value of 5.0. Wherein Bostwick is a measure of viscosity according to the Bostwick method. The product is diluted to 8° Brix and the flavor are tested as reference. The Lycopene content in the final product is 410 ppm and the a/b value was 2.0 as tested by Hunter tristimulus calorimeter.

Example 2

Process for Obtaining Tomato Pulp and Tomato Concentrate from Tomato Juice 30 ton/hr tomato feed (Brigade variety from BetHashita Farm 5° Brix, 120 ppm lycopene), after washing sorting crushing hot break heating to 95° C. and finishing through Rossi & Catelli 0.8 mm screen, are split into two streams: Stream one, 7 ton/hr is fed to a decanter (centrifugal separator) which separates the tomato juice to 0.8 ton tomato pulp containing 91% moisture. The removal of said pulp may effect the a/b color ratio that correlates with lycopene content and the color of the final tomato concentrate 6.2 ton/hr serum is then added to stream two.

Stream two—23 ton/hr tomato juice and 6.2 ton/hr serum from stream one is fed to an evaporator. The product of 30° Brix has the same texture as the tomato concentrate described in Example 1 and a Bostwick of 5.5 (measured at a Brix of 12°) and the color a/b value=1.98.

The tomato concentrate is diluted to 8° Brix, 7° Brix, 6° Brix and tested for tomato flavor compared to the reference from Example 1. The 7° Brix from Example 2 is found to have an equal flavor to the 80 Brix concentrate from Example 1.

The pulp is stored at (−18)° C. and then spray dried 35 ton pulp feed provides 3.3 tons of dry pulp with 4% moisture (96% drying recovery). The dried pulp, also referred to as tomato fibers, is tested for water absorbance capacity which is found to be 1:25.

Example 3

Tomato Concentrate Preparation—Comparative Example

Stream 1-7 ton/hr tomato feed (Brigade variety from BetHashita Farm 5° Brix)—after washing sorting crushing finishing through Rossi & Catelli 0.8 mm screen at ambient temperature and then heating to 90° C., is fed to a decanter which separates the tomato juice to 0.4 ton tomato pulp containing 81% moisture and 6.6 ton/hr serum.

Stream 2-25 ton/hr tomato feed (Brigade verities from BetHashita Farm 5° Brix)—after washing sorting crushing hot break heating to 95° C. and finishing through Rossi & Catelli 0.8 mm screen, are mixed with the 6.6 ton/hr serum from stream 1, and fed to the tomato evaporator. The tomato concentrate obtained is of 30° Brix having a low viscosity of 9.5 Bostwick. This tomato concentrate is not suitable for the regular tomato concentrate applications.

Example 4

Dried Pulp Composition as Colorant 2.5 gr of conventional tomato powder containing 0.12% lycopene was added to a 100 gr of yoghurt. 300 mg of dry pulp composition of the present invention (Lycomato Fiber) containing 1% Lycopene, achieved the same color value. The yoghurt to which the tomato powder was added had a pronounced tomato flavor while the sample to which the Lycomato Fiber was added was free from tomato flavor.

While embodiments of the invention have been described by way of illustration, it will be apparent that the invention may be carried out with many modifications, variations and adaptations, without departing from its spirit or exceeding the scope of the claims.

The invention claimed is:
1. An industrial process for obtaining tomato pulp and tomato concentrate from tomato juice, said process comprising:
    a) separating the tomato juice to a first part and a second part, said first part containing up to 20% of the total of said tomato juice, b) separating said first part containing up to 20% of the total tomato juice into pulp and serum, and
c) adding the serum obtained from step b) to the second part of the juice to obtain mixture thereof, which mixture is further concentrated to obtain tomato concentrate.

2. A process according to claim 1 further comprising a step of drying the pulp obtained from step b).

3. A process according to claim 1 wherein said first part comprises up to 15% of the tomato juice.

4. A process according to claim 1 wherein the separation of the pulp from the tomato juice is conducted by centrifugation.

* * * * *

UNITED STATES PATENT AND TRADEMARK OFFICE
CERTIFICATE OF CORRECTION

PATENT NO.       : 7,641,931 B2  
APPLICATION NO.  : 10/525064  
DATED            : January 5, 2010  
INVENTOR(S)      : Zelkha et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Sixteenth Day of November, 2010

David J. Kappos  
*Director of the United States Patent and Trademark Office*